United States Patent [19]

Richter

[11] 4,423,628

[45] Jan. 3, 1984

[54] METHOD AND APPARATUS FOR MONITORING THE LENGTH OF A LIQUID COLUMN

[76] Inventor: Olaf A. Richter, Neuer Weg 30 A, D-3504 Kaufungen, Fed. Rep. of Germany

[21] Appl. No.: 317,557

[22] Filed: Nov. 2, 1981

[30] Foreign Application Priority Data

Jul. 18, 1981 [DE] Fed. Rep. of Germany ....... 3128507

[51] Int. Cl.³ .......................................... G01F 23/28
[52] U.S. Cl. ................................. 73/290 R; 73/304 C
[58] Field of Search .................. 73/290 R, 304 C; 340/612, 620; 324/57 Q, 61 QS, 61 QL

[56] References Cited

U.S. PATENT DOCUMENTS 2,523,363 9/1950 Gehman ....................... 73/290 R X
4,169,543 10/1979 Hall ..................................... 340/612

*Primary Examiner*—James J. Gill
*Attorney, Agent, or Firm*—Larson and Taylor

[57] ABSTRACT

A method and apparatus are provided for monitoring the length of a liquid column such as the filling level of a beverage bottle. A predetermined high frequency signal is applied to a parallel circuit wherein, in one branch, a liquid column is connected by means of electrodes coupled to the ends of the column such that the column, i.e., a filled bottle, will produce more or less resonance in the first branch. The increase or decrease of resistance at resonance in the first branch will be reflected in a corresponding change in the power or current detected in the second branch. In instances where preset limit values are exceeded, an error is indicated and the improperly filled bottle is removed. When monitoring the filling level of beverage bottles, the latter are successively guided past the electrodes, with the upper electrode being coupled to the necks of the bottles through an air gap. The movement of the bottles through the monitoring station can be continuous and in this case, triggering of the operation of the monitoring station is effected in dependence on the position of the test bottle relative to the electrodes.

33 Claims, 4 Drawing Figures

METHOD AND APPARATUS FOR MONITORING THE LENGTH OF A LIQUID COLUMN

FIELD OF THE INVENTION

The present invention relates to a method and apparatus for monitoring the length of a liquid column of an aqueous solution and, more specifically, for monitoring the filling level of beverage bottles.

BACKGROUND OF THE INVENTION

It is known to monitor the filling level of liquid columns in glass bottles or similar objects using optical techniques. For example, infrared or visible radiation is used to provide transverse irradiation of the liquid column or surface reflection from the liquid column through the use of mirrors and/or other optical components.

The basic disadvantage of such techniques involves the fact that such measurements are negatively influenced by or simply made impossible because of diverse factors such as the presence of labels on the bottles, dirt and foam in and/or on the bottles, the shapes of the bottles, agitation of the bottles, the color of bottles and many other factors. Because of this, such optical techniques are of only limited use and are not suitable for many applications. Optical techniques of the type described above are disclosed, for example, in the U.S. Pat. Nos. 3,133,638, 3,218,463 and 3,225,191.

It is also known to monitor liquid columns using gamma rays wherein irradiation of a liquid column with gamma rays is effected by means of a radiator and a slit diaphragm. This approach has certain advantages since, for example, tin cans may also be irradiated. On the other hand, the use of such processes is generally subject to industrial licensing procedures. Moreover, certain radiation problems, and other problems in connection with public opinion (which is often highly negative) have limited the general use of such techniques.

SUMMARY OF THE INVENTION

The present invention concerns the provision of a method and apparatus of the type discussed above which enables very precise but completely harmless monitoring of the lengths of liquid columns, such as of filled beverage bottles, in a relatively simple and cheap manner.

Generally speaking, the invention is based on the concept of using high frequency signals for monitoring purposes. In this regard, investigations have been made, within the scope of the present invention, as to the feasibility of transverse radiation of a test object with such high frequency signals. It has been found, however, that irradiation transverse to the longitudinal axis of the liquid column produces very imprecise results. However, on the other hand, it was found, within the scope of the present invention, that longitudinal irradiation of the liquid column with high frequency signals produces very favorable results.

In accordance with the invention, a parallel electrical circuit, comprising a first branch containing the liquid column and a second branch connected in parallel thereto, is connected to a frequency electrical signal of a predetermined power or current. The signal is applied to the liquid column in a substantially longitudinal direction, and is of such a frequency that in the first branch, in a longitudinal area of the liquid column to be monitored, electrical resonance occurs at a frequency depending on the length of the column. The magnitude of the electric power or current at resonance as measured in the second branch is used as a measure of the length of the liquid column. Consequently, when predetermined high frequency power, or a corresponding high frequency current, is applied to the two branches, the power (or current) in the second branch is directly related to that in the first branch. Stated differently, because of the resonance phenomenon as reflected into in the second branch and, in particular, because of the lowering, or raising, at resonance, of the high frequency resistance of the first branch and thus the corresponding redistribution of power applied to, or current flow in, the second branch, the length of the liquid column affecting resonance may be monitored by determining the power or the current in the second branch. This technique is quite simple, and because of the use of resonance phenomenon, the method is very precise. Further, because of the use of a low power, high frequency signal, the method is completely harmless. The interfering factors mentioned above in connection with optical techniques, as well as other factors which disturb the measurement, are substantially insignificant with the present high frequency method of the invention.

In one embodiment, the first branch is operated as a resonant sink, so as to provide a lowering of the branch resistance at resonance. In this embodiment, a minimum power, or a minimum current, is produced in response to a liquid column of the correct length, in the parallel second branch. The opposite conditions exist when the first branch is operated as a pumping branch, i.e., produces an increase in resistance at resonance. Under this circumstance, when the liquid column, is of the correct length maximum power, or a maximum current, is produced in the parallel second branch. Both embodiments are essentially equivalent and either may be used depending on the particular application.

Preferably, high frequency signal is coupled to the liquid column by way of an air gap. This approach is advantageous because of the simplicity thereof, although it is possible to omit the use of such an air gap.

Advantageously, a high frequency of about 1 MHz to about 1 GHz, preferably of 27.12 MHz, is used. In view of the utilization of resonance phenomenon, this frequency range has proven to be particularly effective. A high frequency power of about 0.1 mW may be used and it is thus apparent that the use of the high frequency process of the invention is completely harmless.

In a preferred embodiment, a theoretical value range is assigned to the longitudinal range of the liquid column to be monitored corresponding to power or current values detected in the second branch, and determined relative to an increasing or decreasing flank of the resonance characteristic wherein power, or current, is plotted as a function of column length. Using this approach, it can be readily determined whether or not the monitored liquid column is too short or too long, since the actual determined value will not fall within the theoretical value range. It is also advantageous to determine direction of the deviation from the theoretical value range, i.e., whether the actual value is too high or too low, rather than simply determining that the actual value does not fall within the range in question.

In an alternate preferred embodiment, a theoretical value range is assigned to the longitudinal area of the liquid column to be monitored, corresponding to power or current values detected in the second branch and determined relative to a minimum or maximum of the resonance characteristic. Because of the clear change in the characteristic at resonance, a particularly precise monitoring result can be obtained. However, information is not provided as to whether the actual value lies above the upper limit of the theoretical value range or below the lower limit of this range, and thus whether the liquid column is too long or too shot. In cases in which such information is not required, this embodiment is particularly suitable for use in applications where high precision is a requirement.

The inventiion is particularly adapted to monitoring a plurality of liquid columns in succession at a rapid rate and thus the determination of the power or current values is synchronized in time in the second branch with this monitoring rate. As a result of this, faulty outputs may be avoided in the time intervals between two successive monitoring operations.

In accordance with a preferred embodiment of the invention, a monitoring apparatus of the type discussed above is provided which includes a high frequency generator which produces a predetermined output power or current and a parallel circuit connected to the output of the generator. A first branch of the parallel circuit is electrically coupled to the liquid column to be monitored, (i.e., a filled beverage bottle) by way of electrodes located at the ends of the column. The second branch of the parallel circuit includes evaluating means for determining and evaluating the magnitude of power or current in the second branch. The use of a parallel circuit has particular advantages although it would basically be possible to use a series circuit with suitable modification. The determination of the magnitude of power or current in the second branch takes place completely separately from the liquid column and enables the length thereof to be precisely monitored.

Advantageously, at least the lowermost electrode is coupled to the liquid column by way of a bottom wall of a container, such as the bottom wall of a glass bottle, which receives the liquid column. The container wall will not disturb the resonance phenomenon in any way and provides a clear separation between the electrode and the liquid. It is particularly advantageous to couple the upper electrode to the liquid column by way of an air gap, and optionally, and in addition, by way of the container wall. As long as the air gap is sufficiently small, such a gap will not disturb the resonance phenomenon. In fact, such an air gap enables contactless coupling of the high frequency signal to the liquid column located, for example, in a glass bottle.

In a further embodiment, the lowermost electrode is connected to a mass associated with a bottle conveyor or formed thereby. Such bottle conveyors take a number of forms and may, for example, comprise a conveyor trough or a conveyor belt on which, for example, filled beverage bottles are conveyed past the monitoring arrangement.

In a particularly advantageous embodiment, the uppermost electrode includes oppositely directed electrode shoes which are directly connected with one another electrically and between the lower ends of which pass the upper end of a liquid column of the desired length. The provision of electrode shoes on both sides of the column enables one to compensate for errors in the position of the column because of the fact that because when the air gap becomes larger at the one electrode shoe, the air gap at the other electrode shoe becomes smaller. Both electrode shoes are at the same fixed potential so that no high frequency current flows between them. A further advantage of positioning the electrode shoes on both sides of the column is that coupling of the high frequency signal to the liquid column is enhanced.

Preferably, the uppermost electrode forms a channel aligned with the bottle conveyor, for passage of the neck of a bottle. the maximum length of the channel is equal the diameter of the bottle. With this arrangement, and through the provision of proper synchronization or triggering of the monitoring operation, it can be assured that only one liquid column is monitored at a time, because, due to the location of the upper electrode, two liquid columns can never be located in the area of influence of the upper electrode at the same time. In order to increase the precision of the measurements obtained and in order to substantially avoid scattering of the high frequency signal, it is preferred that the electrode shoes always be spaced at a distance of about 3–50 mm from the neck of the bottle. This distance is sufficiently small to enable, even with due consideration to positional tolerances, contactless coupling to the liquid column. This is important because the upper electrode is stationary and the liquid columns (for example, filled beverage bottles) move with the conveyer. A further improvement concerns the provision of outside screening for the upper electrode. This increases the precision of the result obtained in that scattering of high frequency signal is substantially eliminated. This embodiment is particularly important whenever the individual members of a liquid column series are monitored successively. In this case, it is preferred that the external screening surround or encompass the electrode shoes on the sides along the path of travel of the liquid columns so that the influence of the liquid column adjacent to that under test can be eliminated.

Preferably, an electrical component or device for influencing the resonance, e.g., a tuning device, is located between one of the electrodes, i.e., the upper electrode, and the high frequency generator. Such a device helps produce resonance and enables crude and/or fine tuning of the resonant circuit in accordance with operating conditions. This approach is used when the first branch operates as a resonant sink. In the case of operation as a "pumping circuit", the first branch includes a first circuit in which the liquid column is connected and a second circuit connected in parallel with the first circuit and including the at least one electrical component or device for influencing resonance, i.e., the tuning device. This approach assists in producing resonance and enables crude and/or fine tuning of the resonant frequency.

In a preferred practical embodiment, the circuitry in the second branch includes a high frequency recitifer and a window discriminator connected to the output of the rectifier. By providing high frequency rectification and by using a power dissipation device, such as a resistor, it is possible to determine the power or the current in the second branch of the parallel circuit, a voltage proportional to this power or current being fed to the window discriminator. For this purpose, an amplifier such as an operation amplifier is preferably located between the high frequency rectifier and the window discriminator. This enables clear recognition of those instances in which the length of the liquid column does not fall within a predetermined (longitudinal) theoretical value range, so that measures can be taken to rectify the situation.

In a further embodiment, a triggering unit is provided for synchronizing the operation of the window discriminator and the high frequency action of a liquid column. Advantageously, a proximity switch is used in activating the window discriminator whenever a container for the liquid column, such as a beverage bottle, is present within the operating range of both electrodes. For example, an optical, inductive, capacitive, magnetic or mechanic scanner can be used in this connection. As a result of the approach, the window discriminator provides fault recognition only when a liquid column (or a container for the column) is actually located in the operating area of both electrodes. Faulty operation is thus safely avoided.

In the embodiment employing a window discriminator, acoustical and/or optical indicating means are preferably connected to the window discriminator for recording the "faulty" liquid columns, e.g., for recording the improperly filled beverage bottles. Alternately, or additionally, a release device is connected to the output of the window discriminator for removing such faulty liquid columns, e.g., such improperly filled beverage bottles. In the first instance, the operating personnel are informed about the existence of the fault, while in the second instance, provision is made for automatic operation wherein the improperly filled bottles are diverted or removed.

Advantageously, an adjustable support is provided for the upper electrode to enable readily adaptation of the vertical position thereof to the length of the liquid column to be monitored.

The invention will be explained in more detail below in connection with the specific embodiments shown in the drawings.

DESCRIPTION OF THE PREFERRED EMBODIMENTS

In a preferred application of the arrangement according to the invention, beverage bottles lined up in side by side relationship are conveyed through the arrangement one following the other and are checked individually as to the level to which they are filled. Since the beverage bottles are filled in large installations at a very high speed of, for example, 80,000 bottles per hour, this checking or monitoring operation is of very considerable importance. The monitoring process must also be carried out with precision, taking into consideration the continuous movement of the bottles, in order to be able to sort out those beverage bottles whose filling level deviates an unacceptable amount from a theoretical desired level. It will be appreciated that improper filling at a filling location or station cannot be avoided in any practical system and thus there will be repeated instances where levels of filling are either too great or too small.

Figure 1:
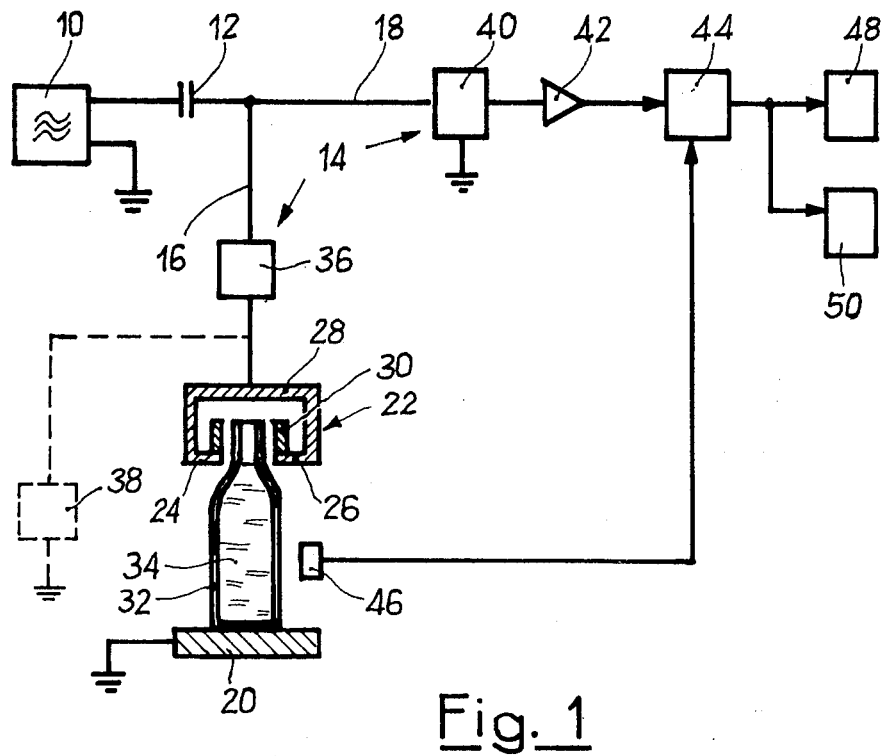
FIG. 1 is a schematic representation of an embodiment of an arrangement according to the invention suitable for use in carrying out the process according to the present invention.

Referring to FIG. 1, a parallel circuit, indicated generally at 14, is connected in the illustrated embodiment by way of a coupling capacitor 12 to a high frequency generator 10 which, for example, produces a frequency of 27.12 MHz at a power of 0.1 mW. Because high frequency generator 10 delivers substantially constant power or substantially constant current, a power or current distribution takes place which is directly proportional to the relationship between the resistances in the first and second branches 16 and 18 of the parallel circuit 14.

The first branch 16 includes a lower electrode 20 which is grounded to the mass on which the test sample is supported and an upper electrode 22 which is coupled to the test sample by way of an air gap. In the present embodiment, the upper electrode 22 includes two electrode shoes 24, 26 which are disposed at the same lateral distance from the test sample and which are connected directly to one another by way of a bridging shoe connection 28 to the electric circuit. Thus, the electrode shoes 24, 26, are always at the same potential. A metallic shoe mount 30 is disposed at the spaced ends of the electrode shoes 24, 26 which are directed toward each other. Thus, the upper electrode 22 provides a kind of channel or passage through which a beverage bottle 32 passes. The bottle 32 contains a liquid column 34 therein in the form of a beverage, with the neck of the bottle being disposed in such a way that in the ideal filling state the upper end of the liquid column 34 will be approximately in the area of the electrode shoes 24, 26 or somewhat therebelow. The coupling of a high frequency signal to the liquid column 34 thus is accomplished at both ends thereof by way of (i) the air gap located between the electrode shoes 24, 26 and the liquid column 34 and (ii) the glass bottom wall of the beverage bottle 32 which engages electrode 20. It is noted that it is also possible to dispose the upper electrode 22 directly above the liquid level and not on both sides thereof as in FIG. 1. The contactless, high frequency coupling in the area of the upper electrode 22 is extremely advantageous in applications, such as the exemplary embodiment under consideration, wherein the test samples are moved rapidly such that the necks of the beverage bottles 32 pass at a high speed through the channel or passage provided by the upper electrode 22.

In the embodiment of FIG. 1, a component or device, which is generally denoted 36 and which influences the resonance frequency of the electrical circuit, is inserted into the first branch 16 (or in branch 18) between the upper electrode 22 and the coupling capacitor 12. Device 36 can comprise a tuning device for coarse and/or fine tuning. Alternatively, or additionally, it is possible, according to the embodiment illustrated in FIG. 1, to provide corresponding component or device 38, indicated in dashed lines, for influencing resonance. The device 38 may comprise a tuning member and is connected in parallel with the upper electrode 22 as well as with the test sample. The device 38 may also be connected directly to the connection between the coupling capacitor 12 and the second branch 18. When device 36 is used, the first branch 16 basically acts as a resonant sink which, at resonance, provides a low resistance path, and when device 38 is used, branch 16 acts as a "pumping" circuit which, at resonance, provides a high resistance path.

The second branch 18 contains a high frequency rectifier 40 which detects the increased or decreased current flow at resonance. Rectifier 40 may comprise a high frequency diode rectifier employing silicon diodes, an associated smoothing capacitor, and a resistance voltage limiter. The starting signal developed thereby is fed by way of an amplifier 42 to the input of a window discriminator 44. The amplifier 42 may be an operational amplifier, including a feedback and frequency compensation loop, which provides a gain of about 1:250. The window discriminator 44 may comprise a Siemens Model TCA 965 discriminator which is connected to threshold switches (not shown), Siemens Model TCA 345, used in pulse formation.

The operation of the window discriminator 44 is synchronized with the high frequency signal applied to liquid column 34, or with the presence of a beverage bottle 32 at a monitoring location or station in the area of the electrodes 20, 22. For this purpose, a contactless proximity switch 46 is provided at the monitoring station, which, in response to the presence of a test sample at the monitoring station, triggers the window discriminator 44. The output of window discriminator 44 is connected to an optical and/or acoustic recording means 48 and to a triggering device 50 which, in the case of a fault, will provide for removal of faulty test sample from the row of beverage bottles 32 that are to be monitored. Furthermore, a register or counter (not shown) may be connected with the window discriminator 44 which provides a record of what has happened during the operation of the system.

Figure 2:
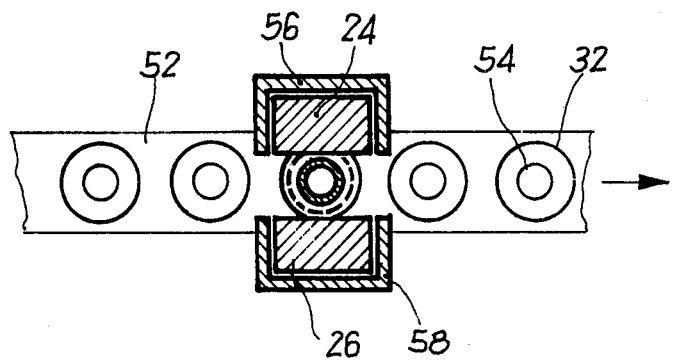
FIG. 2 is a partially sectioned plan view of a bottle conveyer and an upper electrode of the arrangement according to the invention.

Referring to FIG. 2, it will be seen that the beverage bottles 32 are arranged close together in a row on a bottle conveyor 52 which may comprise, for example, a channel conveyor or a belt. The lower electrode 20 of FIG. 1 may be connected, in the embodiment of FIG. 2, to the bottle conveyor 52 or may be formed therefrom. The necks 54 of the beverage bottles 32 move in the direction of the arrow through the channel or passage between the electrode shoes 24, 26, with the air gap between the neck 54 of the bottle and the electrode shoes 24, 26 being approximately 5 to 10 mm. Advantageously, the length of the electrode shoes 24, 26 measured in the direction of movement of the beverage bottles 32 is not substantially greater than the diameter of the bottles so that any influence of adjacent test samples on the monitoring results is eliminated or minimized. In order to improve these results, the electrode shoes 24, 26 are, in the embodiment of FIG. 2, surrounded by screens 56, 58 which are U-shaped in cross section and which provide a reduction in the high frequency scatter, especially with respect to adjacent test samples so that the coupling of the high frequency signal to the sample under test is optimized. Although in the embodiment shown, the length of the electrodes measured in the direction of movement of the bottles 32 corresponds approximately to the diameter of the bottles, a shorter length, corresponding to the diameter of the neck 54 of the bottle, will suffice. This length may be in the range of 3 to 50 mm and in a specific example, about 35 mm.

The upper electrode 22 is preferably adjustable vertically by means (not shown) so that the electrode shoes 24, 26 can be positioned approximately in the region of the upper liquid level or somewhat above this level. The arrangement is thus preset prior to the actual monitoring operation in accordance with the type of test samples to be monitored or the desired length of the liquid column 34.

Figure 3:
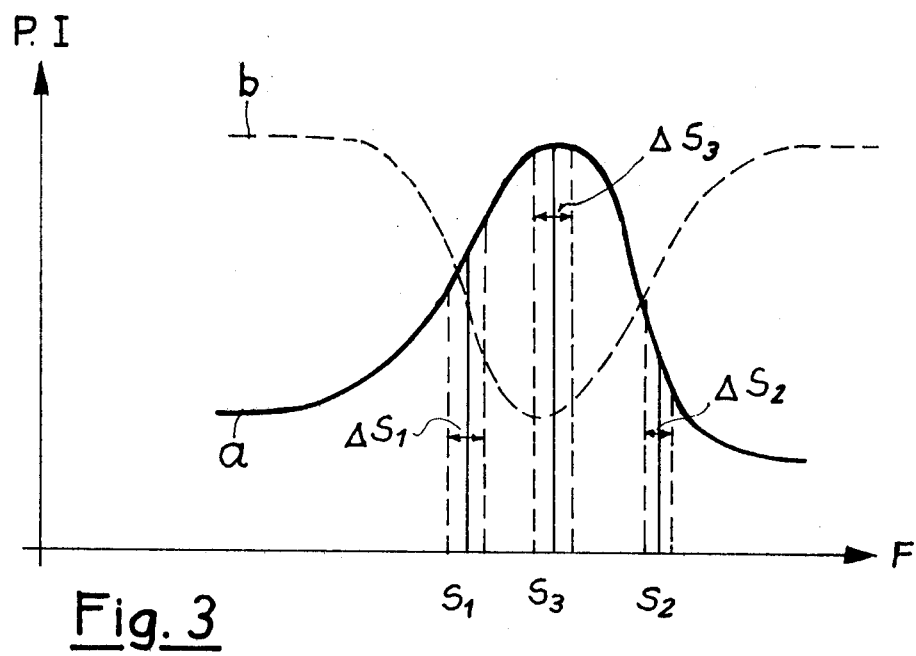
FIG. 3 are curves used in explaining the method of operation of the process according to one embodiment of the invention.

Referring to FIG. 3, the curves shown therein illustrate the basic dependence of the magnitude of the power or current flow P, I in the second branch 18 upon the actual length of the liquid column 34, i.e., the filling level F. The values are amplified or reduced at resonance in correspondence to the behavior at resonance of the first branch 16. Specifically, curve a, shown in solid line, represents the case where the first branch 16 forms a "pumping" circuit while curve b, shown in dashed lines, represents the case of a "sink". Both approaches are equally valuable and for the sake of simplicity, curve a will be considered in discussions which follow. The theoretical values of the length of the liquid column 34, denoted $S_1$, $S_2$ or $S_3$, may be considered in relationship to the rising or falling flank to maximum or minimum of the resonance curve chosen. Further, certain theoretical value ranges $\Delta S_1$, $\Delta S_2$ or $\Delta S_3$ may be assigned to the individual theoretical values. It will be appreciated that when the detected filling level is not within the pertinent theoretical value range, and therefore is either too small or too large with respect to the endpoints of the range, a faulty filling operation for the corresponding bottle will be indicated.

Figure 4:
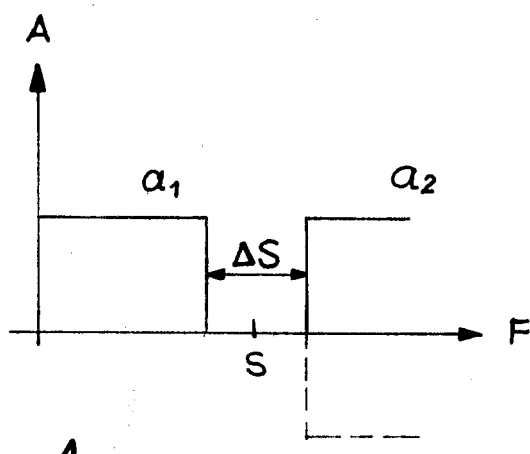
FIG. 4 shows the starting signal for a window discriminator used in a further embodiment of the present invention.

Referring to FIG. 4, the diagram shown therein illustrates the dependence of the output or triggering signal A produced by the window discriminator 44 upon the actual filling level F for two different cases. In both cases the window discriminator 44 will not produce an output signal A for a theoretical value range $\Delta S$ centered around the actual theoretical value. For this theoretical value range $\Delta S$, it is assumed that the filling level F is approximately correct and no correction is required. However, as soon as the actual filling level F becomes smaller than the theoretical value S, by an amount equal to one half the theoretical value area $\Delta S$, the window discriminator 44 produces a first output signal $a_1$. Further, when the actual filling level F is correspondingly greater than the theoretical value S, a similar output signal $a_2$ is produced. Alternately, an output signal $a_3$, shown in a broken line and of opposite polarity, can be produced. It will be appreciated that whereas the signals $a_1$ and $a_2$ do not enable to differentiate between "too high" and "too low", differentiation is easily obtainable in the case of the signals $a_1$ and $a_3$. Accordingly, the output signals $a_1$, $a_2$ are suitable, for the theoretical value $S_3$ of FIG. 3 while the output signals $a_1$ and $a_3$ are preferably used for the theoretical values $S_1$, $S_2$ of FIG. 3.

It should be pointed out that the theoretical value area $\Delta S$, which is shown as being arranged symmetrically in relation to the theoretical value S, does not have to be absolutely symmetrical. Moreover, the relationship between the output signal A produced by the window discriminator 44 and the filling level F shown in FIG. 4 is merely exemplary and many variations are possible. For example, the signals $a_1$, $a_2$, $a_3$ may be variable in amplitude corresponding to the actual value of the detected power or current, so that at least with the theoretical values $S_1$ and $S_2$ of FIG. 3, differentiation between "directional" errors resulting from too little or too much filling is also possible.

It will be understood that apart from the changes described above further variations with regard to individual details can be effected within the scope of the present invention. However, it is important that the first branch of the parallel circuit, i.e., that containing the test sample, be a tuned resonant circuit and that further tuning or complete tuning to a certain value area be provided by the test sample only in the instance of the presence of a liquid column of a correct length or containing a beverage at the correct filling height of a beverage bottle. This resonance behavior is reflected, and correspondingly determined, by coupling a predetermined high frequency signal of preselected power or current to the second branch of the parallel circuit.

Although the invention has been described in relation to exemplary embodiments thereof, it will be understood by those skilled in the art that variations and modifications can be effected in these exemplary embodiments without departing from the scope and spirit of the invention.

I claim:

1. A method for monitoring the length of a liquid column, such as the filling height of a beverage bottle, said method comprising locating the liquid column in the first branch of a parallel electrical circuit, applying a high frequency electrical signal to the electrical circuit which penetrates the liquid column in a substantially longitudinal direction and which is of a frequency such that electrical resonance is produced in the first branch of the parallel circuit in dependence on the length of the liquid column, and measuring an electrical parameter in the second branch of the parallel circuit as an indication of the length of the liquid column.

2. A method as claimed in claim 1, wherein the first branch constitutes a resonant sink such that the resistance therein is lowered at resonance.

3. A method as claimed in claim 1, wherein the first branch constitutes as a pumping branch such that the resistance thereof is increased at resonance.

4. A method as claimed in any one of claims 1 to 3, wherein the high frequency electrical signal is coupled to the liquid column by way of an air gap.

5. A method as claimed in claim 4, wherein a high frequency of about 1 MHz to about 1 GHz is used.

6. A method as claimed in claim 5, wherein high frequency power of about 0.1 mW is used.

7. A method as claimed in claim 1, wherein a theoretical value range for the magnitude of the parameter to be measured in the second branch and associated with a theoretical value for the length of the liquid column to be monitored is determined relative to an increasing or decreasing flank on the resonance characteristic.

8. A method as claimed in claim 7, wherein the direction of the deviation from the theoretical value range is determined.

9. A method as claimed in claim 1, wherein a theoretical value range for the magnitude of the parameter to be measured in the second branch and associated with a theoretical value for the length of the liquid column to be monitored is determined relative to a minimum or maximum on the resonance characteristic.

10. A method as claimed in claim 1 wherein a plurality liquid columns are processed individually and successively at rapid rate, and the determination of the magnitude of the parameter to be measured in the second branch is synchronized with this rate.

11. An apparatus for monitoring the length of a liquid column, such as the filling height of a beverage bottle, said apparatus comprising a high frequency electrical signal generator parallel circuit connected to the output of said generator, said parallel circuit including a first branch including electrodes for electrically connecting the ends of the column to be monitored to said branch thereby coupling the liquid column to the generator which is of a frequency such that electrical resonance is produced in the first branch, and a second branch including means for detecting in said second branch an electrical parameter associated with the electrical signal produced by said generator and thereby providing a measure of the length of the liquid column being monitored.

12. Apparatus as claimed in claim 11 wherein at least the lowermost electrode of said electrodes is coupled to the liquid column by way of a lower wall of a container in which the column of liquid is located.

13. An apparatus as claimed in claim 11 or 12, wherein the uppermost electrode of said electrodes is coupled by way of an air gap to said liquid column.

14. An apparatus as claimed in claim 13, wherein the lowermost electrode of said electrodes is connected to a mass associated with a bottle conveyor for conveying bottles containing the liquid columns.

15. An apparatus as claimed in claim 14, wherein the uppermost electrode of said electrodes includes two oppositely directed electrode shoes between the lower ends of which the upper end of a liquid column of the desired length is, in operation, disposed.

16. An apparatus as claimed in claim 15, wherein the uppermost electrode forms a passage in alignment with said bottle conveyer and which at least partially surrounds the individual necks of a bottle carried by said conveyor, the maximum length of said passage being equal to the diameter of the bottle.

17. An apparatus as claimed in claim 16, wherein the electrode shoes are fixedly spaced a distance of about 3–50 mm from the neck of the bottles.

18. An apparatus as claimed in claim 16 further comprising external screening means for screening the electrode shoes on the sides thereof away from said passage.

19. An apparatus as claimed in claim 11, further comprising external screening means for screening the uppermost electrode of said electrodes.

20. An apparatus as claimed in claim 11 including means, connected between one of the electrodes and the high frequency generator, for influencing the resonant frequency of said first branch.

21. An apparatus as claimed in claim 20 wherein said resonant frequency influencing means comprises a tuning device.

22. An apparatus as claimed in claim 20 that the first branch includes a first circuit in which the liquid column is connected and a second circuit connected in parallel with said first circuit including said means for influencing the resonant frequency of the first branch.

23. An apparatus as claimed in claim 11 wherein said detecting means includes a high frequency rectifier connected in the second branch and a window discriminator connected to the output of said rectifier.

24. An apparatus as claimed in claim 23, further comprising indicating means connected to the output of said window discriminator for indicating those liquid columns which are of a length not falling within a predetermined range of lengths.

25. An apparatus as claimed in claim 24 wherein said indicating means comprises recording means.

26. An apparatus as claimed in claim 23 further comprising an operational amplifier connected between the high frequency rectifier and the window discriminator.

27. An apparatus as claimed in claim 23 or 26 further comprising a triggering unit for synchronizing the operation of said window discriminator with the application of the high frequency signal to a liquid column being monitored.

28. An apparatus as claimed in claim 27, wherein said triggering unit comprises a proximity detector for activating the window discriminator responsive to the presence of a liquid column within the detection range of said electrodes.

29. An apparatus as claimed in claim 28 wherein said proximity detector comprises an optical detector.

30. An apparatus as claimed in claim 28 wherein said proximity detector comprises an electrical detector.

31. An apparatus as claimed in claim 28 wherein said proximity detector comprises a mechanical detector.

32. An apparatus as claimed in claim 11 comprising triggering means connected to the window discriminator for providing the removal of liquid columns which lengths do not fall within a preselected range.

33. An apparatus as claimed in claim 11 wherein the uppermost electrode of said electrodes is vertically adjustable.

* * * * *